No. 890,105. PATENTED JUNE 9, 1908.
W. H. TILSON.
TYING MECHANISM FOR HARVESTERS.
APPLICATION FILED MAY 6, 1907.

2 SHEETS—SHEET 1.

WITNESSES:

William H. Tilson INVENTOR

By C. A. Snow & Co.
ATTORNEYS

No. 890,105. PATENTED JUNE 9, 1908.
W. H. TILSON.
TYING MECHANISM FOR HARVESTERS.
APPLICATION FILED MAY 6, 1907.

2 SHEETS—SHEET 2.

WITNESSES:

William H. Tilson
INVENTOR

By C. A. Snow & Co.
ATTORNEYS

UNITED STATES PATENT OFFICE.

WILLIAM H. TILSON, OF PLAINVIEW, TEXAS.

TYING MECHANISM FOR HARVESTERS.

No. 890,105.  Specification of Letters Patent.  Patented June 9, 1908.

Application filed May 6, 1907. Serial No. 372,158.

*To all whom it may concern:*

Be it known that I, WILLIAM H. TILSON, a citizen of the United States, residing at Plainview, in the county of Hale and State of Texas, have invented a new and useful Tying Mechanism for Harvesters, of which the following is a specification.

This invention has relation to tying mechanisms for harvesters and it consists in the novel construction and arrangement of its parts as hereinafter shown and described.

The object of the invention is to provide a mechanism of the character indicated which is especially adapted to bind and tie shocks of corn or similar grain.

The mechanism consists of a needle of peculiar configuration which is mounted upon the harvester and is adapted to describe its movement horizontally or substantially so inasmuch as the stalks composing the shock are bundled in substantially vertical position. The mechanism also comprises a twine knotter and holder and a knot stripper actuated by the holder for removing the knot from the knotter. Said stripper is in the form of a pivoted plate having a recess for receiving the twine and holding the same in position to be actuated upon by the knotter and also retaining the twine in proper position to be severed by a knife carried by the said plate.

The holder is provided with a clamp adapted to confine the twine, one of the members of said clamp is rigid while the other member is resilient and means is provided for regulating the resiliency or tension of the last named clamp member. The knotter and holder are supported by a bracket to which is attached a breast plate and which in turn receives and is supported by a sleeve adjustably mounted on a shaft. Said sleeve is provided with a disk for actuating the knotter and holder. Means is provided for adjusting the sleeve longitudinally along its supporting shaft and also for adjusting the needle upon its support in order that the shock or sheaf may be bound at any desired point between the ends of the grain. Inasmuch as the needle moves horizontally its periphery is provided along its entire length with a groove for holding the twine and thus the twine is held against drooping across the grain passage.

Figures 1, 2:
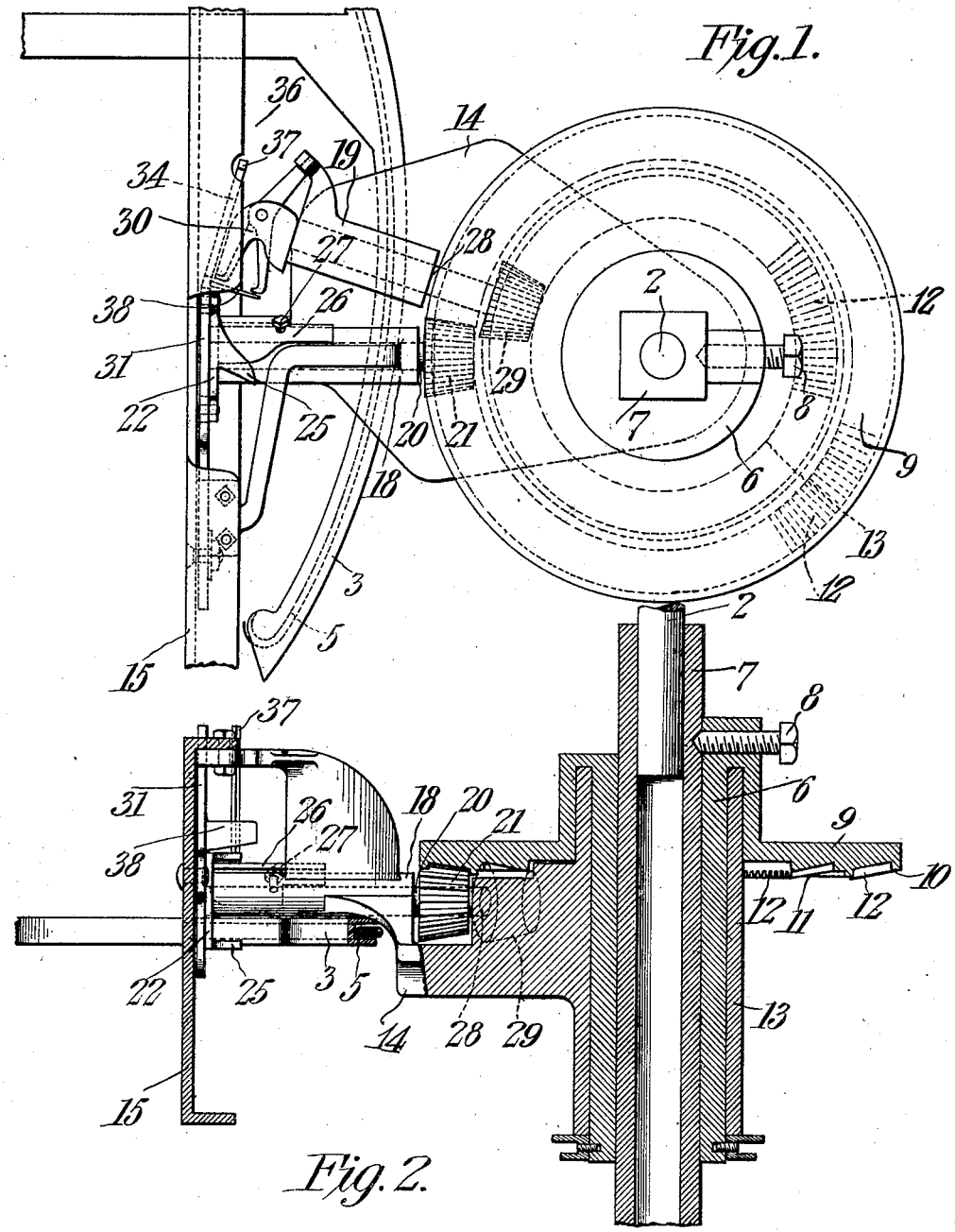
Figure 4:
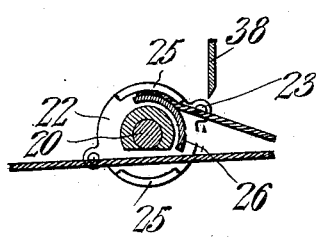
Figure 5:
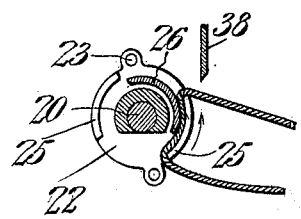
Figure 3:
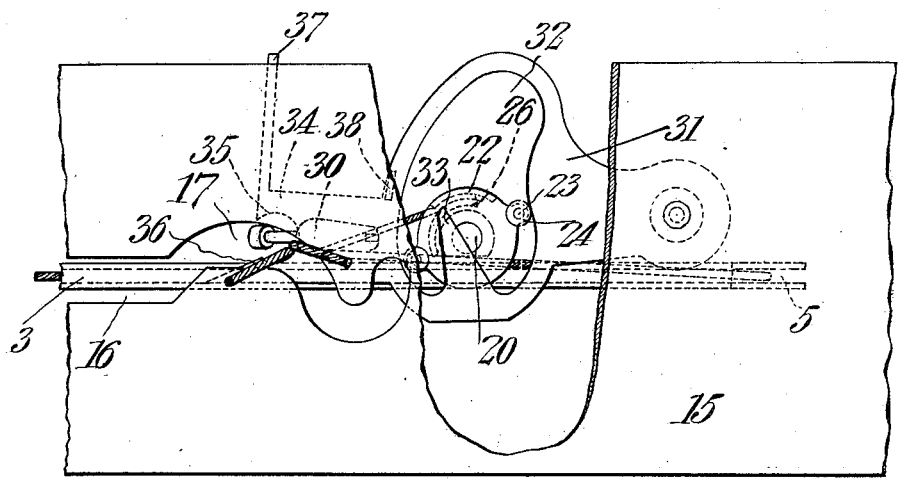
Figure 6:
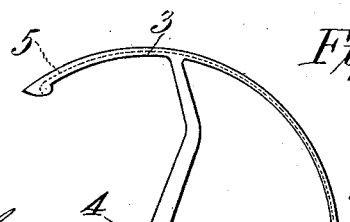

In the accompanying drawing:—Figure 1 is a top plan view of the tying mechanism. Fig. 2 is an elevation of the same with parts in section. Fig. 3 is a side view of the same with parts broken away. Fig. 4 is a transverse sectional view of the twine retainer showing the parts in one position. Fig. 5 is a similar view showing the parts in another position, and Fig. 6 is a side elevation of the needle.

The harvester is provided with the needle shaft 1 and the knotter shaft 2 which extends parallel to each other. The needle 3 is mounted upon the shaft 1 and may be adjusted longitudinally thereof and secured in such adjusted position by means of a set screw 4 or its equivalent. The periphery of the needle 3 is provided with a channel 5 which extends along the entire length of the needle and is adapted to receive the binding twine and protect and support the same along the entire length of the needle which traverses the grain passage in the usual manner when the shaft 1 is actuated by its connections with moving parts of the harvester. The sleeve 6 is mounted upon the non-circular shaft 7 and may be adjusted longitudinally thereof and secured in such adjusted position by means of the set screw 8. The disk 9 is carried by and, in fact, is a part of the sleeve 6. The said disk 9 is provided with the ledges or flanges 10 and 11, each of which is provided at suitable sections with gear teeth 12. The collar 13 is mounted upon the sleeve 6 and the said sleeve may rotate within the said collar. The collar 13 is provided at one side with a bracket 14 to the extremity of which is attached the breast plate 15. The breast plate 15 is provided with the needle slot 16 which in turn is provided with an ogee terminal 17, which is located adjacent the holding and knotting mechanisms as will hereinafter appear. The bracket 14 is provided with the bearings 18 and 19 which are radially disposed with relation to the disk 9. The holder shaft 20 is journaled in the bearing 18 and is provided with the gear wheel 21 which lies under the ledge 10 of the disk 9 and is adapted to be actuated by the gear 12 of the said ledge. The disk 22 is fixed to the opposite end of the shaft 20 and is provided upon its face adjacent the breast plate 15 with the lugs or pintles 23 upon which are journaled the friction rollers 24. The ends of the pintles 23 bear against the side of the breast plate 15. The disk 22 is provided upon its opposite side with the spaced peripheral flanges 25. Said disk is mounted upon the end of the shaft 20 and rotates with the same. The spring member 26 is fixed at one end to a stationary part of the bracket 14 or the bearing 18 and at its opposite end terminates in a plane between the tops and bottoms of the flanges 25 and the last said end of the member 26 lies between the flanges 25 and the shaft 20. The member 26 is resilient and is provided with a set screw 27 the end of which bears against the bearing 18. The flanges 25 successively form a clamp in conjunction with the member 26 in which the said flanges are rigid members and member 26 is resilient. The end of the twine is retained or held in this clamp. By reason of the fact that the member 26 is provided with a set or adjusting screw the tension of the said member may be regulated in order to permit the twine to slip sufficiently at the end of the movement of the knotter bill as will hereinafter appear.

The knotter bill shaft 28 is journaled in the bearing 19 and is provided at one end with a gear wheel 29 which lies under the ledge 11 of the disk 9 and is adapted to be engaged and actuated by the gear section 12 thereof. The opposite end of the shaft 28 is provided with a knotter bill 30 which as is usual consists of a fixed and pivoted jaw and means for swinging the pivoted jaw.

The stripper consists of the plate 31 which is pivoted to the breast plate 15 and which is provided with an opening 32 for receiving the pintles 23 and rollers 24. The longitudinal axis of the opening 32 describes an arc of a circle struck upon the pivotal point of the plate 31 as a center and the said plate 31 is provided with a tongue or lug 33 which projects into the opening 32. The plate 31 is provided with the inclined portion 34 which lies adjacent the knotter bill 30 and substantially at right angles to the longitudinal axis of the shaft 28. The portion 34 is provided with a notch 35 which is located in a plane between the upper and lower edges of the flanges 15. The notch 35 normally lies opposite the first curved portion of the ogee extremity 17 of the needle slot 16 and the portion 34 is provided with the beveled extension 36, the beveled edge of which normally lies across the longitudinal axis of the needle slot 16 as shown in dotted lines in Fig. 3. The said portion 34 is also provided with the extension 37 which is adapted to cross the ogee extremity 17 of the needle slot 16 when the plate 31 is actuated to strip the knot from the knotter bill. The knife 38 is mounted upon the plate 31 at a point between the twine holder and knotter.

From the foregoing description it is obvious that the needle 3 may be shifted longitudinally of the shaft 1 and secured at any desired point and that the sleeve 6 may be correspondingly adjusted upon the shaft 7. By reason of the fact that the bracket 14 and the parts thereon are supported by the said sleeve the breast plate 15 and knotter and holder may be readily adjusted so that they may coöperate with the needle.

The operation of the mechanism is as follows:—Presuming that one end of the twine is retained in the clamp formed by one of the flanges 25 and the member 26 and that the said twine extends transversely across the grain passage of the harvester after first passing through the notch 35 of the stripper 31 and then through the first curved portion of the ogee extremity 17 of the needle slot 16 and then extending along the channel 5 of the needle 3. The grain as it is cut bears against that portion of the twine which traverses the grain passage. At the proper time the needle shaft 1 is actuated and the needle 3 is carried across the grain channel and the twine following the needle encircles the grain. The twine also follows through the needle slot 16, from thence into the first curved section of the ogee extremity 17, then through notch 35 and across the disk 22 between the shaft 20 and that flange 25 at the opposite side of the disk from the member 26. The shaft 7 is then actuated which rotates the sleeve 6 and the disk 9 and the gear section 12 of the ledge 11 engages the gear wheel 29 and the shaft 28 and knotter bill 30 describes a complete revolution. As the knotter bill 30 rotates it engages the twine at a point between the notch 35 and the disk 22 and carries the same around and forms the knot when the pivoted jaw of the said bill opens in the well known manner and grasps the twine. This occurs at about the time that the revolution of the knotter bill 30 is complete. Just prior to the completion of the revolution of the knotter bill the gear 12 of the ledge 10 engages the gear wheel 21 of the shaft 20 and rotates the same. As the disk 22 rotates the flange 25 adjacent the said twine engages the twine and moves opposite the resilient member 26. Thus the said twine is carried between the flange 25 and the resilient member 26 and is clamped. After the twine is clamped as above described one of the lugs 23 arrives at the base of the projection 33 of the plate 31 and as the roller 24 of the said lug 23 engages the edge of the said projection the plate 31 is swung upon its pivot which carries the knife 38 across the twine at a point between the disk 22 and the notch 35. Thus the twine is cut and at the same time the notch 35 moves longitudinally along the knotter bill 30 and strips the knot from off of the said bill. As the projection 37 follows the notch 35 and extends across the extremity 17 of the needle slot 16 the ends of the twine applied to the bundle are warded off against catching upon any part of the mechanism. Inasmuch as the pintles 23 and flanges 25 are mounted in duplicate upon the disk 22 the shaft 20 describes one-half of a revolution only to actuate the plate 21. The said plate is returned to its normal position by gravity or a spring acting as the equivalent thereof. The end of the knotter bill 30 normally lies opposite the second curved portion of the ogee end 17 of the needle slot 16, which portion of the said extremity affords ample room for the cord attached to the bundle to move laterally as the stripper is removing the knot from the knotter bill.

Having described my invention what I claim as new and desire to secure by Letters Patent is:—

1. A mechanism as described comprising a twine holder, a knotter and a needle, means for actuating the same, said needle having a twine receiving groove located at its periphery and extending along its entire length.

2. A mechanism as described comprising a twine holder, knotter and needle, means for actuating said parts and a stripper for the knotter actuated by the twine holder.

3. A mechanism as described comprising a needle, a twine holder and a knotter, a breast plate supported adjacent the twine holder and knotter and having a needle slot, a plate mounted upon the breast plate and having a notched portion spaced from the breast plate and lying adjacent the knotter in a plane at a right angle to the shaft thereof.

4. A mechanism as described comprising a needle, a twine holder and knotter, a breast plate having a needle slot provided with an ogee extremity, a stripper pivotally mounted upon the plate and having a twine receiving notch located adjacent the knotter, the end of the knotter normally lying adjacent the end of the ogee extremity of the needle slot.

5. A mechanism as described comprising a twine holder, a knotter and needle, means for operating the said parts, a pivoted stripper having a twine receiving notch, a knife mounted upon the stripper and means carried by the twine holder for actuating the stripper.

6. A mechanism as described comprising a twine holder, a knotter and a needle and twine holder and means for operating the same, a stripper pivotally mounted and having an opening, lugs carried by the twine holder and entering the opening of the stripper for actuating the same.

7. A mechanism as described comprising a needle and a knotter, a twine holder made up in part of a disk carrying upon one side clamp members and lugs upon its opposite side, a pivotally mounted stripper having an opening which receives the said lugs and by which the said stripper is actuated.

In testimony that I claim the foregoing as my own, I have hereto affixed my signature in the presence of two witnesses.

WILLIAM H. TILSON.

Witnesses:
L. M. FAULKNER,
F. FAULKNER.